(12) United States Patent
Shmueli

(10) Patent No.: US 7,621,553 B2
(45) Date of Patent: Nov. 24, 2009

(54) TOWABLE INFLATABLE BALLOON LAUNCHPAD AND OPERATIONS TRAILER

(75) Inventor: Rami Shmueli, Tel-Aviv (IL)

(73) Assignee: R-T Ltd., Bet Dagan (IL)

( * ) Notice: Subject to any disclaimer, the term of this patent is extended or adjusted under 35 U.S.C. 154(b) by 607 days.

(21) Appl. No.: 11/068,742

(22) Filed: Mar. 2, 2005

(65) Prior Publication Data
US 2006/0197308 A1   Sep. 7, 2006

(51) Int. Cl.
*B60D 1/66* (2006.01)
*B62D 63/00* (2006.01)
(52) U.S. Cl. .................................. 280/475; 280/400
(58) Field of Classification Search ................. 280/400, 280/475
See application file for complete search history.

(56) References Cited

U.S. PATENT DOCUMENTS 1,396,489 A * 11/1921 Williams ..................... 244/33
3,452,949 A *  7/1969 Bassett et al. ................. 244/31
4,421,204 A * 12/1983 Lawrence ..................... 182/50
6,148,551 A * 11/2000 Glass .......................... 40/214

* cited by examiner

Primary Examiner—Paul N Dickson
Assistant Examiner—Marc A Scharich
(74) Attorney, Agent, or Firm—Mark M. Friedman

(57) ABSTRACT

A trailer that is configured for use with an inflatable balloon consisting of a flat bed having a topside and an underside, a front, a left side, a right side and a rear; a tongue; a plurality of suspension systems, axles, and wheels; a balloon stabilization mechanism; a gas bottle storage rack; a centralizing gas piping system with a plurality of bottle connection valves and one inflation valve; a balloon deployment winch; three balloon stabilization winches; an electric generator; an electrical distribution panel, an operational equipment payload docking station, an operational equipment cabling system; and a deflated balloon storage container.

10 Claims, 7 Drawing Sheets

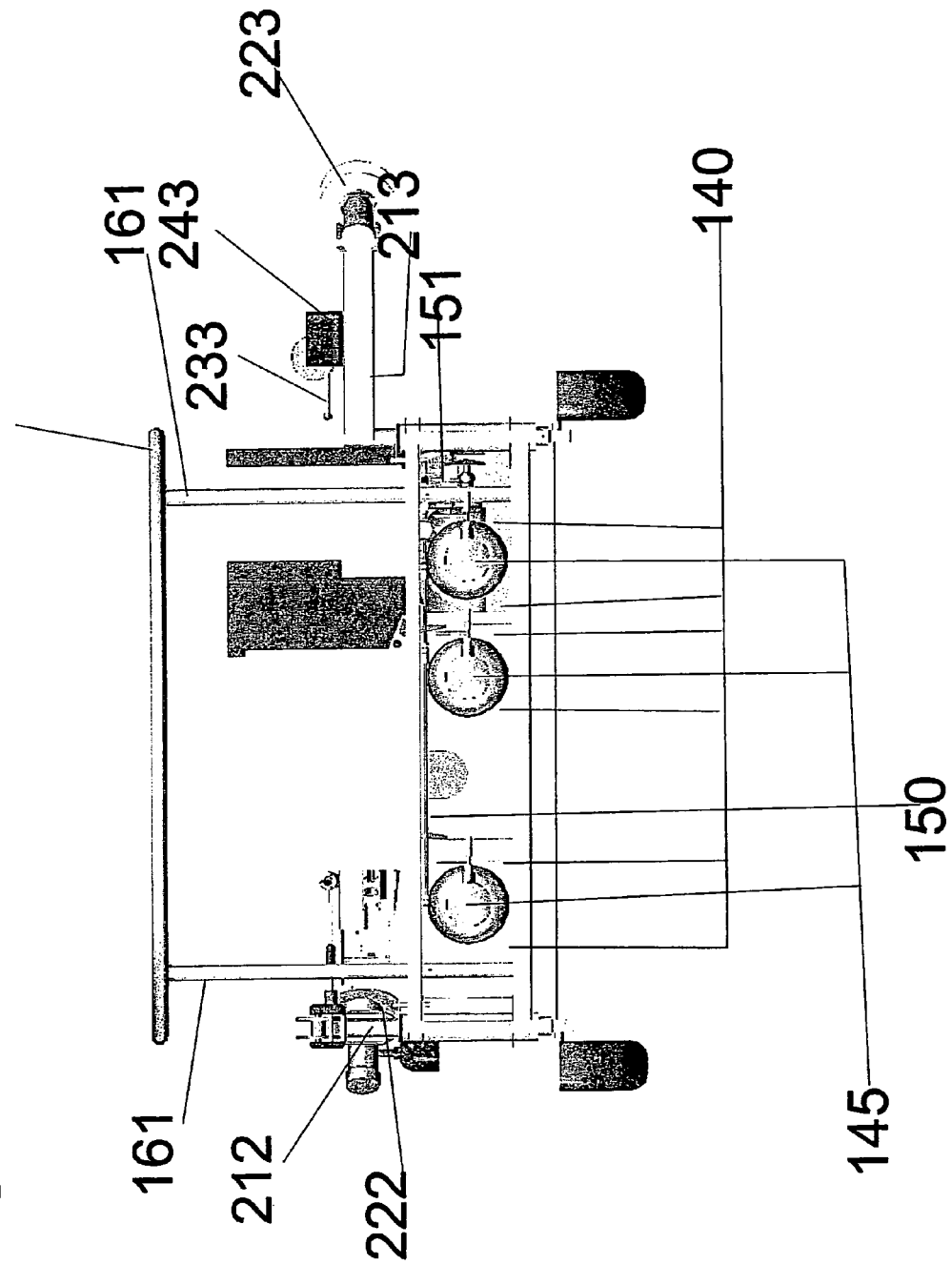

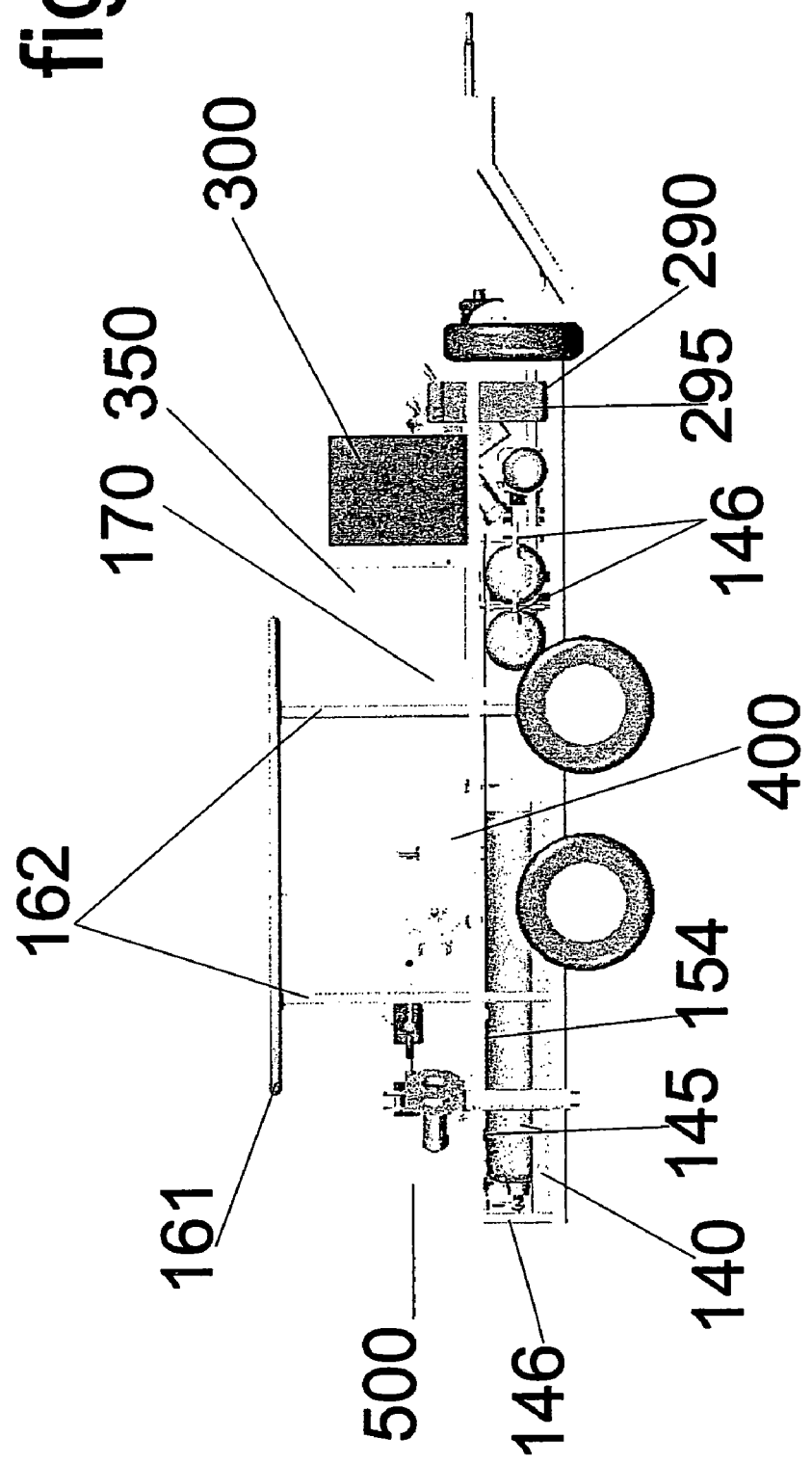

TOWABLE INFLATABLE BALLOON LAUNCHPAD AND OPERATIONS TRAILER

FIELD AND BACKGROUND OF THE INVENTION

The present invention relates to a trailer and, more particularly, to a trailer that is configured to store and transport all of the paraphernalia needed for transport of an inflatable balloon to and from a launch site and to serve as the launchpad and operation center for an inflatable balloon.

The use of inflatable balloons for recreational, scientific, surveillance, advertising, and other purposes is well known in the art. The use of inflatable balloons requires the collection, storage, transport, retrieval, use, and return to storage of many various types and amounts of personnel, materials, and equipment and the provision of a clean, dry, flat, level surface from which to operate. Another significant problem is anchoring the inflatable balloon during the inflation, launch, flight, and recovery phases.

The present invention seeks to address all of these problems by providing a trailer that is configured to provide ample organized space for the collection, storage, transport, retrieval, use, and return to storage of the many various types and amounts of personnel, materials, and equipment needed for use of an inflatable balloon; to provide a clean, dry, flat, level surface from which to operate an inflatable balloon; and to provide a stabilization, launching and anchoring device for the inflatable balloon during the inflation, launch, flight, and recovery phases.

There is thus a need for, and it would be highly advantageous to have, a towable inflatable balloon launchpad and operations trailer.

SUMMARY OF THE INVENTION

According to the present invention there is provided a trailer consisting of a flat bed having a topside and an underside, a front, a left side, a right side and a rear; a tongue; a plurality of suspension systems, axles, and wheels; a balloon stabilization mechanism; a gas bottle storage rack; a centralizing gas piping system with a plurality of bottle connection valves and one inflation valve; a balloon deployment winch; three balloon stabilization winches; an electric generator; an electrical distribution panel, an operational equipment payload docking station, an operational equipment cabling system; and a deflated balloon storage container.

More particularly, the trailer is configured for use with an inflatable balloon. The trailer has a flat bed with a topside, an underside, a front edge, a rear edge, a left edge, a right edge. A towing tongue is structurally and operatively attached to the front edge of the bed. A plurality of paired suspension mechanisms, each having an inboard and an outboard side, are structurally and operatively attached in a paired bilateral fashion to the underside of the bed with their longitudinal axes along the respective left edge and right edge of the bed. An axle with two ends is structurally and operatively attached to and through each pair of suspension mechanisms in a manner that allows protrusion of each end of the axle from the outboard side of each suspension mechanism and rotation of the axle within each suspension mechanism. A plurality of paired wheels are structurally and operatively attached to the ends of each axle in paired bilateral fashion on the outboard side of each suspension mechanism.

An inflatable balloon stabilization mechanism is structurally and operatively attached to the topside of the bed for the purpose of providing a mechanism for the support and tethering of an inflatable balloon. The inflatable balloon stabilization mechanism is made of a plurality of vertical balloon stabilizing posts and a plurality of horizontal balloon stabilizing bars. Each vertical balloon stabilizing posts has a length of approximately one hundred (100) centimeters and a proximal end and a distal end. Each horizontal balloon stabilizing bar has a proximal end and a distal end and a bottom and a top. The proximal end of each vertical balloon stabilizing post is attached to the topside of the bed. The distal end of each vertical balloon stabilizing post is attached to the either the proximal end or distal end or the bottom of one or more horizontal balloon stabilizing bars positioned above the distal end of each vertical balloon stabilizing post.

The inflatable balloon trailer is also configured with a plurality of paired extendable and retractable support stanchions structurally and operatively attached to the underside of the bed along the left and right edge approximately one-quarter of the distance from the most rear point of each edge to the most front point of each respective left and right edge, for the purpose of controlling the lateral tilt of the bed in order to maintaining said bed in a level position. The trailer is further configured with an extendable and retractable support stanchions structurally and operatively attached to the underside of the bed along the approximate center of the front edge for the purpose of controlling the pitch of the bed in order to maintain the bed in a level position.

The inflatable balloon trailer is further configured with a balloon deployment winch structurally attached to the bed and operatively attached to a balloon deployment winch line having a proximal end and distal, which balloon deployment winch line terminates at its distal end with a balloon attachment mechanism for the purpose of attaching said balloon deployment winch line to an inflatable balloon. The inflatable balloon trailer is further configured with a plurality of lateral balloon stabilization winches, each lateral balloon stabilization winch being structurally attached to the bed along the left and right edge approximately one-quarter of the distance from the most rear point of each edge to the most front point of each edge and operatively attached to a respective lateral balloon stabilization winch line having a proximal end and a distal end, which lateral balloon stabilization winch line terminates at its distal end with a balloon attachment mechanism for the purpose of attaching said balloon stabilization winch line to an inflatable balloon.

The inflatable balloon trailer is further configured with a front balloon stabilization winch structurally attached to the bed along the approximate center of the front edge of the bed and operatively attached to a front balloon stabilization winch line having a proximal end and a distal end, which balloon stabilization winch line terminates at its distal end with a balloon attachment mechanism for the purpose of attaching said lateral balloon stabilization winch line to an inflatable balloon. The balloon deployment winch and the balloon stabilizations winches can be operated with manual cranks with electric winch motors. If electric winch motors are used, then a central winch control panel is operatively attached to each respective balloon deployment winch and respective balloon stabilization winches being electrically operated.

The inflatable balloon trailer is further configured with a plurality of extendable and retractable lateral balloon stabilization winch stanchions in a number equal to the number of lateral balloon stabilization winches structurally attached to the bed along the left and right edge approximately one-quarter of the distance from the most rear point of each edge to the most front point of each edge and operatively attached to said lateral balloon stabilization winch and said lateral balloon stabilization winch line for the purpose of extending the lateral distance from a center point of the bed to the said lateral balloon stabilization winch and lateral balloon stabilization winch line and increasing the effectiveness of the said balloon stabilization winch line. A similar extendable and retractable front balloon stabilization winch stanchion is structurally attached to the approximate center of the front edge of the bed and operatively attached to said front balloon stabilization winch and said front balloon stabilization winch line for the purpose of extending the lateral distance from a front edge of the bed to the respective balloon stabilization winch and the respective balloon stabilization winch line and increasing the effectiveness of the respective balloon stabilization winch line.

The inflatable balloon trailer is further configured with an operational equipment payload docking station for the purpose of providing a storage container and housing for any operational payload equipment to be used during the storage, transportation and operation of the inflatable balloon.

The inflatable balloon trailer is further configured with an electric generator structurally and operatively attached to the bed and operatively attached to an electrical power distribution panel, which is in turn attached to the balloon deployment winch, the lateral balloon stabilization winches and the front balloon stabilization winch, and the operational equipment payload for the purpose of providing electrical power to the lateral balloon deployment winches, the front balloon stabilization winch, and the operational equipment payload.

The inflatable balloon trailer is further configured with an operational equipment payload docking station attached to the topside of said bed for the purpose of providing a storage container and housing for operational payload equipment to be used during the storage, transportation and operation of said inflatable balloon. The inflatable balloon trailer is also configured with an operational equipment payload cabling system which is operatively connected between the operational equipment payload docking station and whatever operational equipment payload may be present on the inflatable balloon for the purpose transmitting electrical signals from whatever operational equipment payload may be present on the inflatable balloon to the operational equipment payload docking station.

The present invention successfully addresses the shortcomings of the presently known configurations by providing a single piece of equipment optimally configured to use an inflatable balloon. The present invention discloses an innovative arrangement of many components optimally arranged to ease and simplify the operation of inflatable balloons.

Use of the present invention is intuitively obvious. The inflatable balloon and all associated equipment and supplies required for the use of the inflatable balloon are collected and docked or stored on the present invention and transported to the launch site. The inflatable balloon is removed from its storage container; spread across and tethered to the balloon stabilization device; connected to the primary and second winches, the centralized gas piping system, and whatever other connections to the operational equipment cabling are required for the particular mission. The balloon is then inflated with gas from the bottles using the centralized gas piping system and single inflation valve. The tethers from the balloon stabilization device to the inflatable balloon are released and the balloon ascends to the height approximately equal to the lengths of line let out by the winches. Recovery, deflation and storage of the inflatable balloon and associated equipment is simply a reverse of this process.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a trailer that is configured to provide ample organized space for the collection, storage, transport, retrieval, use, and return to storage of the many various types and amounts of personnel, materials, and equipment needed for use of an inflatable balloon; to provide a clean, dry, flat, level surface from which to operate an inflatable balloon; and to provide an anchoring and launching device for the inflatable balloon during the inflation, launch, flight, and recovery phases. The principles and operation of a device according to the present invention may be better understood with reference to the drawings and the accompanying description.

Figure 1:
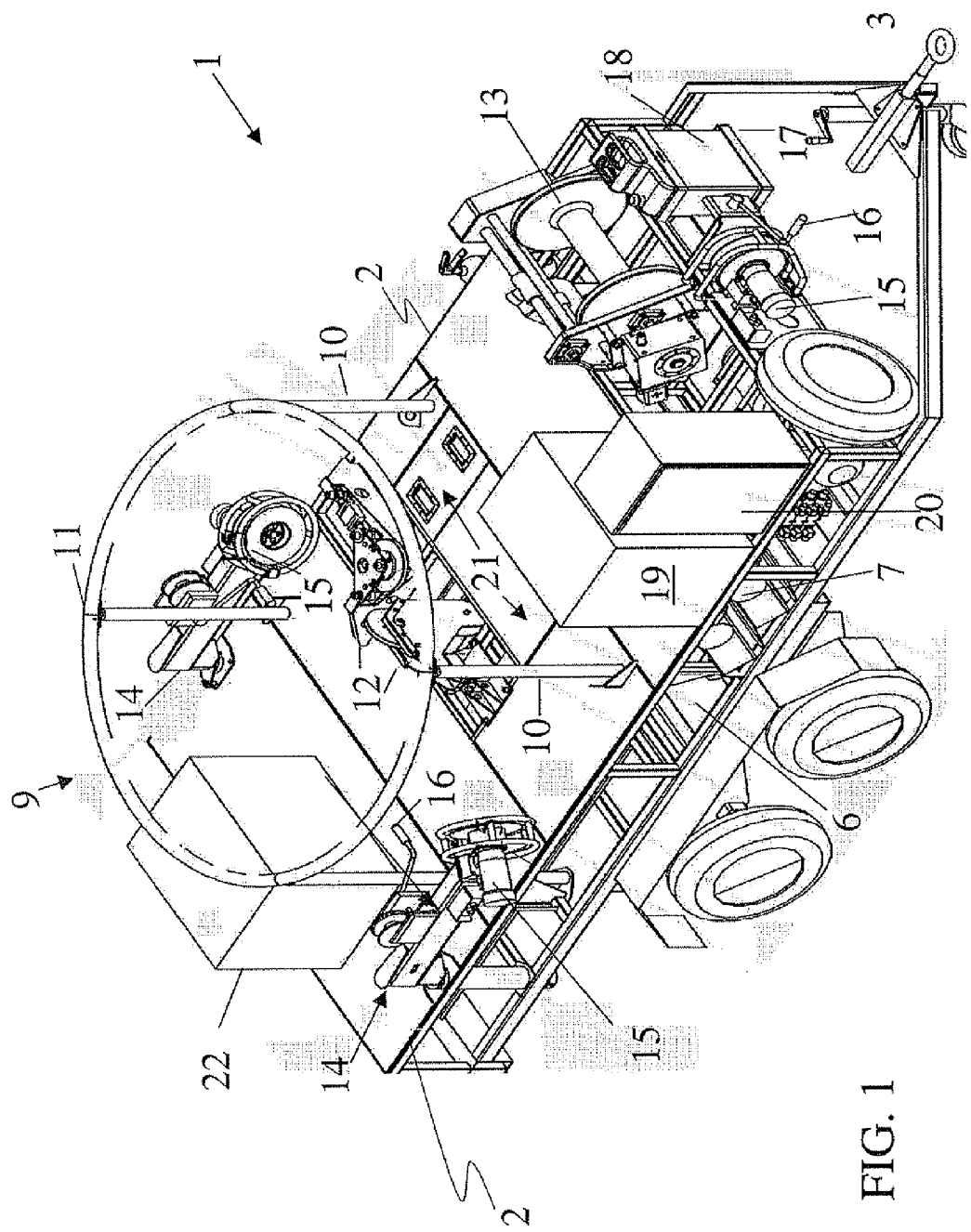
FIG. 1 is an isometric top view of the towable inflatable balloon launch pad and operations trailer.

Referring now to the drawings, FIG. 1 illustrates the top-front-right oblique view of an inflatable balloon trailer device 1 fully configured for operation of an inflatable balloon (not shown). The inflatable balloon has a deployment cable attachment point (not shown) and a plurality of stabilization cable attachment points, (not shown) approximately evenly distributed about the approximately greatest circumference of the inflatable balloon.

The trailer 1 is substantially composed of a bed 2, which has a measures approximately two (2) meters wide by four (4) meters long, but these width and length measurements of the bed 2 may be enlarged or decreased as needed by variations in the size, weight, and amount of balloons and ancillary personnel, materials and equipment needed for use of a particular inflatable balloon.

The front of the inflatable balloon trailer device 1 is configured with a towing tongue 3 for the purpose of attaching the trailer 1 to a towing vehicle.

Figure 2:
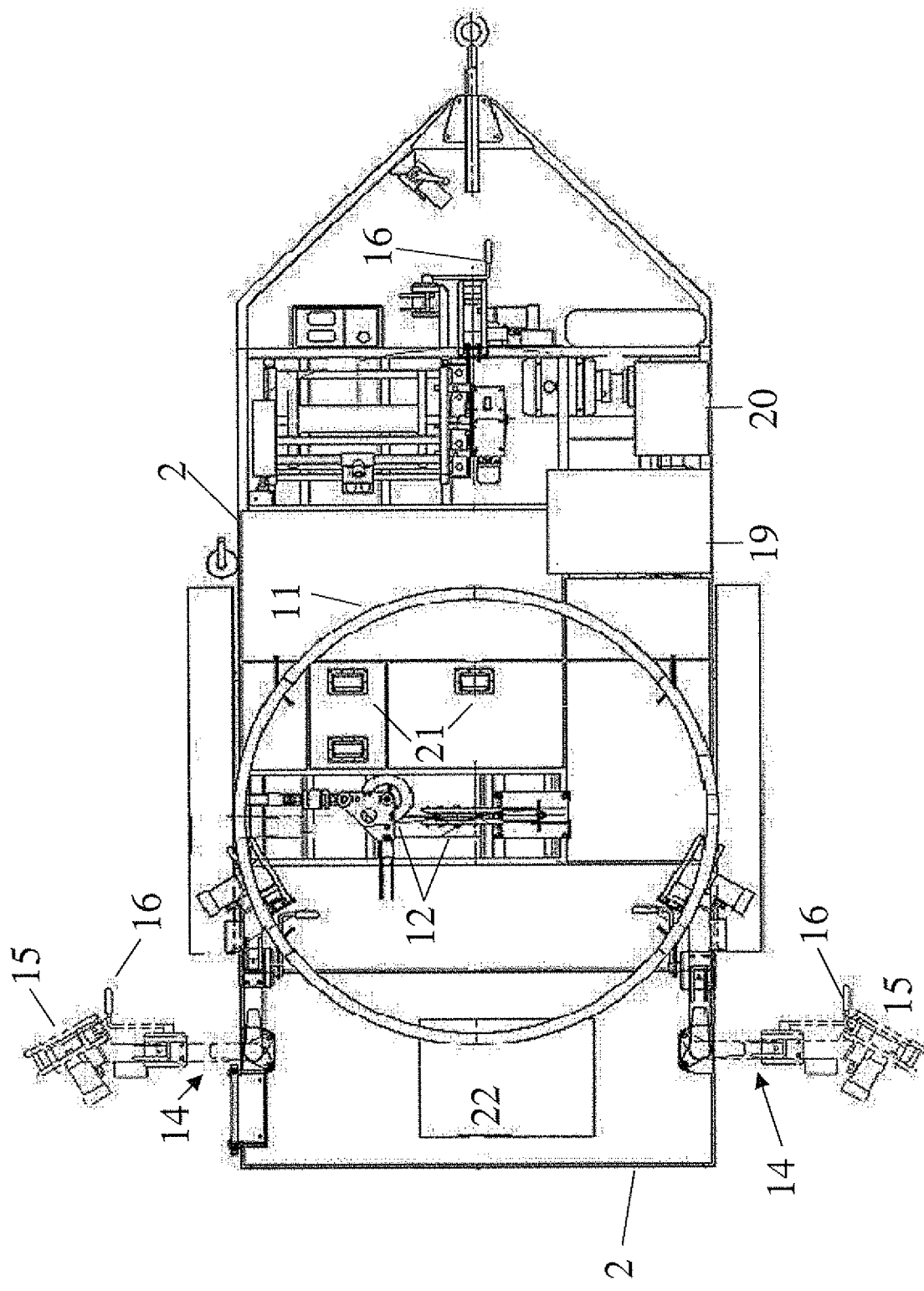
FIG. 2 is a schematic top view of towable inflatable balloon launch pad and operations trailer.

FIG. 2 illustrates that the trailer 10 is configured to rest upon the ground and roll using a plurality of suspension mechanisms 130 structurally and operatively attached to the underside 112 of the bed 110 approximately halfway along the length of each of the left 115 and right 116 sides, which are in turn structurally and operatively attached to a plurality of axles 131, which are in turn structurally and operatively attached to a plurality of wheels 132. While the present embodiment depicts two suspension systems 130, two axles 131, and four wheels 132, the numbers of these components can be enlarged or diminished to reflect the size and weight of the complement of the trailer 10.

Figure 3A:
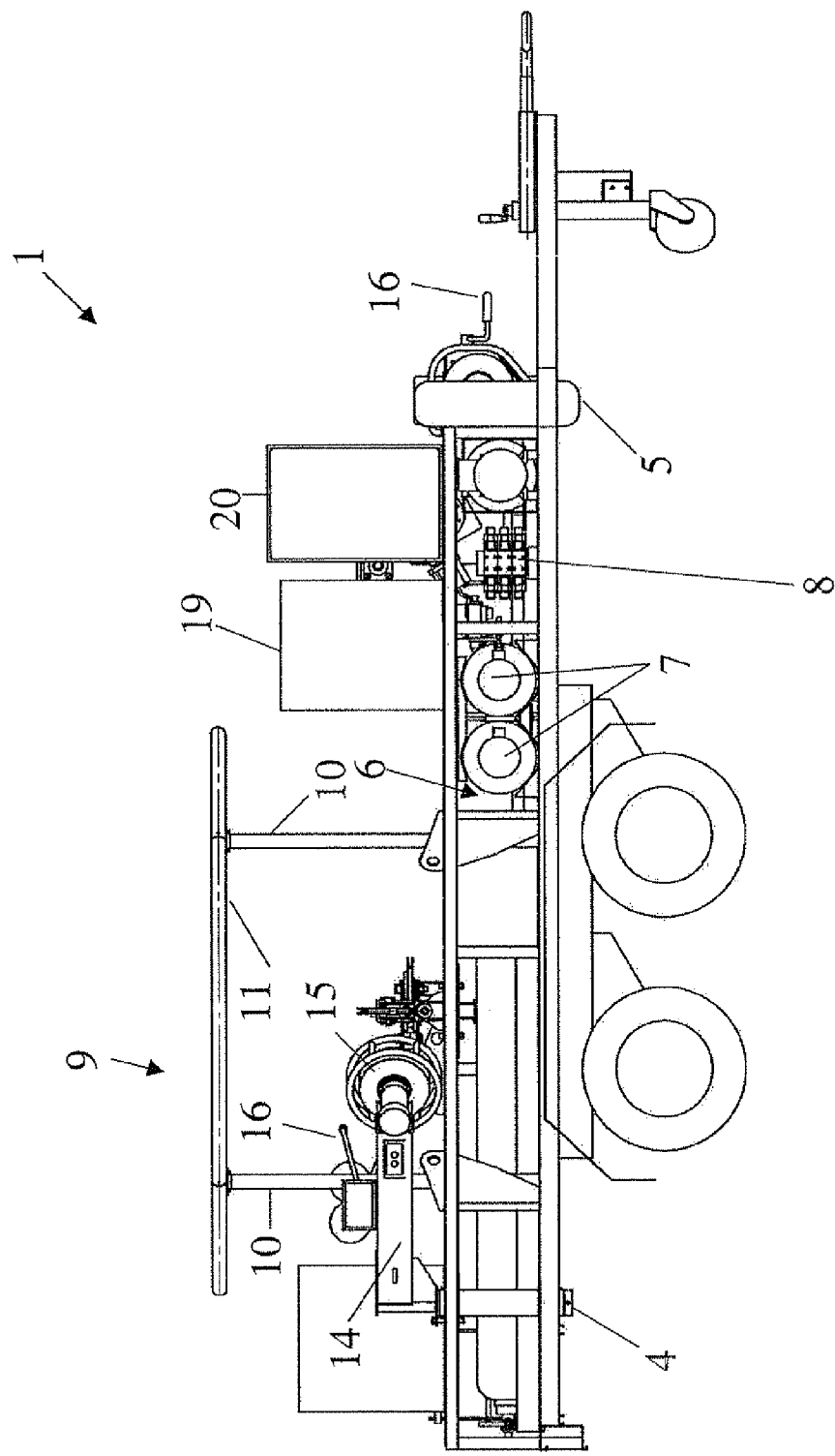
FIGS. 3A and 3B are schematic left side and right side views respectively of a towable inflatable balloon launch pad and operations trailer.
Figure 3B:
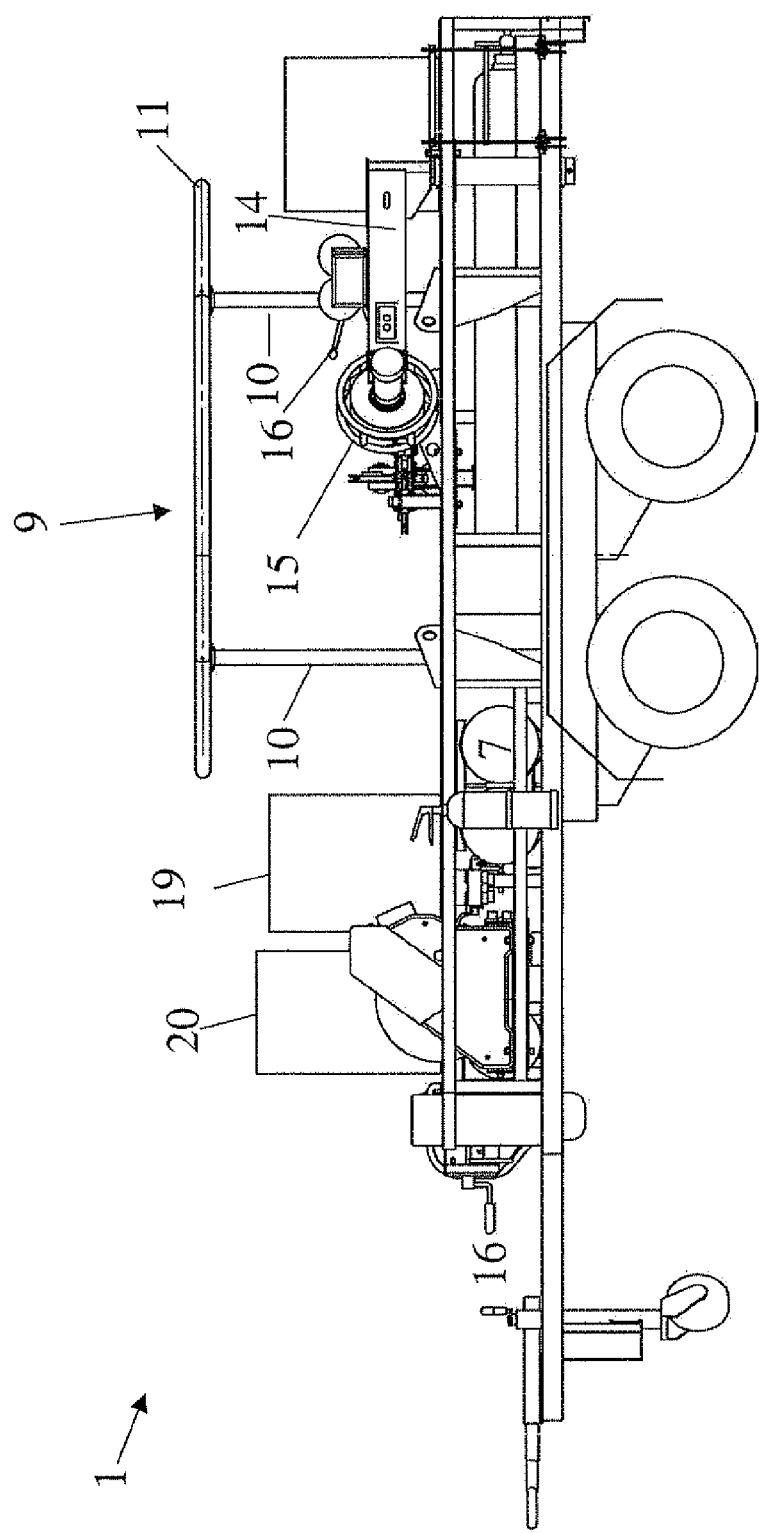
Figure 4B:
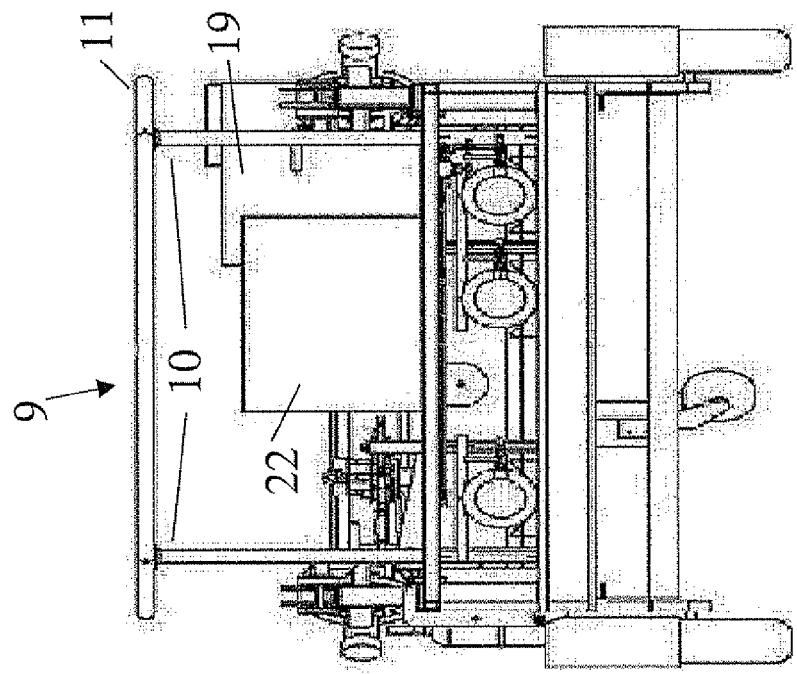
FIGS. 4A and 4B are schematic front and rear view respectively of a towable inflatable balloon launch pad and operations trailer.
Figure 4A:
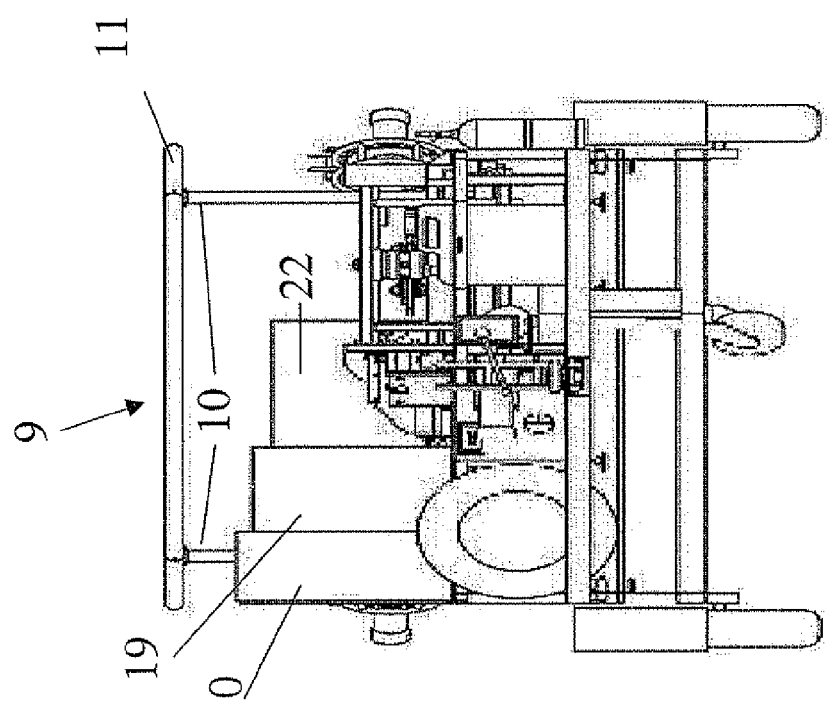

FIGS. 3A and 3B illustrate two deployable and retractable trailer support stanchions 4 attached to the underside of the trailer 1 near the rear of the left and right sides of the bed 2 and one deployable and retractable trailer support stanchion 5 attached to the trailer 1 near the center of the front of the bed 2, for the purpose of stabilizing the pitch and lateral tilt of the trailer 1 during use.

FIGS. 1, 3A, and 3B illustrate that the trailer 1 is further configured with a gas bottle rack 6 for the purpose of receiving and storing a plurality of bottles of gas 7 used to inflate an inflatable balloon. The size of the gas bottle rack 6 may be adjusted relative to the size and number of gas bottles 7 needed for a particular operation. Bach gas bottle 7 has a gas bottle valve (not shown) for the purpose of controlling the release of gas contained in the gas bottle 7. The trailer 1 is further configured with a gas piping system (not shown) composed of one central balloon inflation valve 8 with an operatively attached central balloon inflation gauge (not shown) located beneath a central inflation valve hole (not shown) cut approximately in the center of the front third of the bed 2 (the location of the central balloon inflation valve 8 and central inflation valve hole may be moved and adjusted depending on the dictates of configuring the other operative elements of the trailer). The central balloon inflation valve 8 is operatively attached to a series of gas pipes 9(not shown). Bach gas pipe is directed to and attached to one of a plurality of distal gas bottle fittings (not shown) for the purpose of collecting gas from the gas bottle valves (not shown)of each gas bottle 7 and delivering the gas to the central balloon inflation valve(not shown). The pressure of the gas is monitored by the central balloon inflation gauge (not shown).

Referring to FIGS. 1 through 4B, the topside of the bed 2 is configured with a balloon stabilization mechanism 9 located over the approximate center of the entire width of the bed 2 for the purpose of providing a structure upon which to inflate and to which to tether the inflatable balloon. The balloon stabilization mechanism 9 is composed of a plurality of vertical balloon stabilizing posts 10 and a plurality of horizontal balloon stabilizing bars 11. Each vertical balloon stabilizing posts 10 has a length of approximately one hundred (100) centimeters. The end of each vertical balloon stabilizing post 10 is attached to the topside of the bed 2. The end of each vertical balloon stabilizing post 10 is attached to one or more horizontal balloon stabilizing bars 11 positioned above the distal end of each vertical balloon stabilizing post 10. While the present embodiment depicts four vertical balloon stabilizing posts 10 attaching to one horizontal balloon stabilizing bar 11, which has been bent to make a circular horizontal stabilizing bar 11, other configurations could include a larger or small number of vertical balloon stabilizing posts 10 attached to a plurality of horizontal balloon stabilizing bars 11 forming a balloon stabilization mechanism 9 in the shape of pair parallel horizontal balloon stabilization bars, a triangle of three such horizontal balloon stabilization bars, a square or rectangle of four such horizontal balloon stabilization bars or a respective geometric shape of a larger plurality of parts.

FIG. 2 also illustrates that the topside of the bed 2 is further configured with a deployment winch line guide 12 structurally and operatively attached to the bed 2 beneath the approximate center of the balloon stabilization mechanism 9.

FIGS. 1 and 2 further illustrate a balloon deployment winch 13 located in the corner formed by the intersection of the front and the left hand side of the bed 2 with its winding axis parallel to the front edge of the bed 2.

FIGS. 1 through 3B, also illustrate a plurality of extendable and retractable balloon stabilization winch stanchions 14 located respectively in the center of the front edge of the bed 2 and near the rear of the left and right sides of the bed 2, for the purpose of providing attachment points to the inflatable balloon at distances substantially in excess of the perimeter of the bed 2. Each balloon stabilization winch stanchion 14 has a proximal end and a distal end. The proximal end of each balloon stabilization winch stanchion 14 is attached to the bed 2.

Each balloon stabilization winch stanchion 14, is operatively connected at its distal end to a corresponding plurality of balloon stabilization winches 15. While the present embodiment depicts three balloon stabilization winches 15, located respectively in the center of the front edge of the bed 2 and near the rear of the left and right sides of the bed 2, other embodiments of the present invention could utilize a larger or small number of stabilization winches 15 located at other positions.

The balloon deployment winch 13 and the balloon stabilization winches 15 are operated manually by cranks 16 which are operatively attached to their respective winches 15, or electrically using electric winch motors (not shown) which are also operatively attached to their respective winches 15. The electric winch motors may be controlled directly at the respective winches using electric winch motor switches operatively connected to the respective winch motors #. The electric winch motors may also be remotely controlled from a central winch remote control (not shown) operatively connected to the electric winch motors (not shown).

The balloon deployment winch 13 is operatively connected to a balloon deployment winch line (not shown), which has a proximal end and a distal end. The proximal end of the balloon deployment winch line is attached to the balloon deployment winch 13. The distal end of the balloon deployment winch line (not shown) travels from the balloon deployment winch 13 across the surface of the bed 2 to and through the deployment winch line guide 12 and up to the inflatable balloon where it attaches to the deployment cable attachment point (not shown) of the inflatable balloon.

Similarly, the balloon stabilization winches 15 are operatively connected to balloon stabilization winch lines (not shown) with proximal and distal ends and the distal ends terminate in attachment devices for the purpose of attaching to connection points on an inflatable balloon.

FIG. 1 further illustrates that the topside of the bed 2 is further configured with a gasoline can storage rack 17 in the corner formed by the intersection of the front and the right hand side of the bed 2 with its long axis parallel to the front edge of the bed 2. A gasoline can 18 is depicted in the gasoline can storage rack 17.

FIGS. 1 through 4B also illustrate an electric generator 19. The topside of the bed 2 is further configured with an electrical power distribution panel 20 for distributing electrical power. The electric generator 19 is operatively connected to the electrical power distribution panel 20, for the purpose of providing electrical power, and the electrical power distribution panel 20 is operatively connected to the electric winch motors 15.

FIGS. 1-2 illustrate the topside of the bed 2 is further configured with an operational equipment payload docking station 21 for providing a storage container and housing for operational payload equipment to be used during the storage, transportation and operation of the inflatable balloon.

The bed 2 is further configured with an operational equipment payload cabling system (not shown) which is operatively connected between the operational equipment payload docking station 21 and whatever operational equipment payload may be present on the inflatable balloon for the purpose transmitting electrical signals (not shown) from whatever operational equipment payload may be present on the inflatable balloon to the operational equipment payload docking station 21.

FIGS. 1-4B also illustrate an inflatable balloon storage container 22 for providing a storage place in which to put a deflated inflatable balloon during transport.

While the invention has been described with respect to a limited number of embodiments, it will be appreciated that many variations, modifications and other applications of the invention may be made and all of the configurations described herein are only described as examples and are expressly without the purpose or effect of limiting of the scope of the invention.

What is claimed is:

1. An inflatable balloon launch and operations trailer comprising:
   a. a towable, flatbed trailer,
   b. a plurality of winches containing associated tether lines, each of said winches being connected to said flatbed trailer and each of said tether lines being connected to an inflated balloon so that as each of said winches wind up said associated tether line, the inflated balloon is pulled towards the operations trailer and as each of said winches unwind said associated tether line, the inflated balloon is free to move away from the operations trailer, and
   c. an unenclosed stabilization structure including a plurality of extendable vertical posts attached to said flatbed trailer and a horizontal stabilizing element attached to an upper extremity of said extendable vertical posts so that the inflated balloon is held firmly on said horizontal stabilizing element of said stabilization structure by said tether lines when said tether lines are wound up said winches thereby stabilizing the inflated balloon against winds bearing on the inflated balloon during transport.

2. The inflatable balloon launch and operations trailer of claim 1 wherein said plurality of winches and tether lines include a plurality of stabilization winches and stabilization cables, each of said plurality of stabilization winches being disposed on a horizontally-extendable arm, pivotally mounted to a stanchion rigidly fastened at chosen locations on said flatbed trailer so that said stabilization winches are deployable at locations that dispose said stabilization cables at angles providing optimal stabilization of the inflated balloon.

3. The inflatable balloon launch and operations trailer of claim 1, wherein said pluralities of winches are as winches configurable to operate electrically or manually.

4. The inflatable balloon launch and operations trailer of claim 1, wherein said plurality of winches includes electrically powered winches.

5. The inflatable balloon launch and operations trailer of claim 1 further comprising a central control arrangement operatively linked to each of said winches for controlling each of said winches.

6. The inflatable balloon launch and operations trailer of claim 1 further comprising an electric power source configured to distribute electrical power to said winches and an electrical payload supported by the balloon in its inflated state.

7. The inflatable balloon launch and operations trailer of claim 6 wherein said electric power source includes a connection arrangement for connecting to an existing electric grid.

8. The inflatable balloon launch and operations trailer of claim 1 further comprising a plurality of height adjustable support stanchions attached to the underside of said flatbed operations trailer so as to adjust the tilt of the flatbed thereby maintaining the operations trailer horizontally level when parked on sloping terrain.

9. The inflatable balloon launch and operations trailer of claim 1 further comprising a plurality of storage arrangements for storing supplies and equipment required during transportation, deployment, operation, and recovery of the balloon.

10. The inflatable balloon launch and operations trailer of claim 1 further comprising an electrical communication arrangement for communicating with relevant equipment payload during deployment, operation, and recovery.

* * * * *